(12) United States Patent
Breton et al.

(10) Patent No.: US 9,745,484 B2
(45) Date of Patent: Aug. 29, 2017

(54) WHITE INK COMPOSITION FOR INK-BASED DIGITAL PRINTING

(71) Applicant: XEROX CORPORATION, Norwalk, CT (US)

(72) Inventors: Marcel Breton, Mississauga (CA); Carolyn Moorlag, Mississauga (CA); Frank Ping-Hay Lee Ping-Hay Lee, Oakville (CA); Aurelian Valeriu Magdalinis, Aurora (CA); James D. Mayo, Mississauga (CA)

(73) Assignee: XEROX CORPORATION, Norwalk, CT (US)

(*) Notice: Subject to any disclaimer, the term of this patent is extended or adjusted under 35 U.S.C. 154(b) by 134 days.

(21) Appl. No.: 14/028,369

(22) Filed: Sep. 16, 2013

(65) Prior Publication Data
US 2015/0077501 A1  Mar. 19, 2015

(51) Int. Cl.
| | | |
|---|---|---|
| *C09D 11/322* | (2014.01) | |
| *B41J 2/435* | (2006.01) | |
| *C08K 3/22* | (2006.01) | |
| *C09D 133/08* | (2006.01) | |
| *G03G 9/12* | (2006.01) | |

(Continued)

(52) U.S. Cl.
CPC .......... *C09D 11/322* (2013.01); *B41J 2/435* (2013.01); *C09D 11/037* (2013.01); *C09D 11/101* (2013.01); *C09D 133/08* (2013.01); *G03G 9/122* (2013.01); *B41M 1/06* (2013.01);

(Continued)

(58) Field of Classification Search
CPC ...... B41J 2/435; C09D 133/08; C09D 11/322; C08K 3/22
See application file for complete search history.

(56) References Cited

U.S. PATENT DOCUMENTS

| | | | |
|---|---|---|---|
| 3,945,957 | A | 3/1976 | Noshiro et al. |
| 4,304,601 | A | 12/1981 | Sharp |

(Continued)

FOREIGN PATENT DOCUMENTS

| | | |
|---|---|---|
| EP | 1235863 B1 | 1/2005 |
| JP | 03069954 A | 3/1991 |

(Continued)

OTHER PUBLICATIONS

Lee et al., U.S. Appl. No. 13/474,185, titled "Methods for Manufacturing Curable Inks for Digital Offset Printing Applications and the Inks Made Therefrom," filed May 17, 2012.

(Continued)

*Primary Examiner* — Geoffrey Mruk
*Assistant Examiner* — Scott A. Richmond
(74) *Attorney, Agent, or Firm* — MH2 Technology Law Group LLP

(57) ABSTRACT

A white ink composition for ink-based digital printing includes a white pigment. The white pigment is titanium dioxide. A method for ink-based digital printing includes applying dampening fluid to an imaging member to form a dampening fluid layer, patterning the dampening fluid layer using a laser imaging system, applying a white ink composition to the imaging member surface having the patterned dampening fluid disposed thereon to form an ink image, partially curing the ink image, and transferring the partially cured ink image to a printable substrate.

20 Claims, 2 Drawing Sheets

(51) Int. Cl.
*C09D 11/037* (2014.01)
*C09D 11/101* (2014.01)
*B41M 1/06* (2006.01)
*C08F 222/10* (2006.01)

(52) U.S. Cl.
CPC .......... *C08F 222/1006* (2013.01); *C08K 3/22* (2013.01); *C08K 2003/2241* (2013.01)

(56) References Cited

U.S. PATENT DOCUMENTS

| | | |
|---|---|---|
| 4,403,550 A | 9/1983 | Sharp |
| 4,445,432 A | 5/1984 | Ford, Jr. et al. |
| 4,806,391 A | 2/1989 | Shorin |
| 4,911,999 A | 3/1990 | Legere |
| 4,927,180 A | 5/1990 | Trundle et al. |
| 5,085,698 A | 2/1992 | Ma et al. |
| 5,502,476 A | 3/1996 | Neal et al. |
| 5,834,118 A | 11/1998 | Ranby et al. |
| 5,886,067 A | 3/1999 | Li et al. |
| 5,977,202 A | 11/1999 | Chawla et al. |
| 6,114,489 A | 9/2000 | Vicari et al. |
| 6,329,446 B1 | 12/2001 | Sacripante et al. |
| 6,348,561 B1 | 2/2002 | Mychajlowskij et al. |
| 6,664,015 B1 | 12/2003 | Sacripante |
| 6,896,937 B2 | 5/2005 | Woudenberg |
| 7,022,752 B2* | 4/2006 | Hayashi et al. .............. 523/210 |
| 7,151,153 B2 | 12/2006 | Bruchmann et al. |
| 7,202,006 B2 | 4/2007 | Chopra et al. |
| 7,208,258 B2 | 4/2007 | Gervasi et al. |
| 7,322,688 B2 | 1/2008 | Woudenberg |
| 7,538,070 B2 | 5/2009 | Iftime et al. |
| 7,556,844 B2 | 7/2009 | Iftime et al. |
| 7,674,326 B2 | 3/2010 | Iftime et al. |
| 7,708,396 B2 | 5/2010 | Iftime et al. |
| 7,718,325 B2 | 5/2010 | Norsten et al. |
| 7,723,398 B2 | 5/2010 | Ilg et al. |
| 7,909,924 B2 | 3/2011 | Krishnan et al. |
| 7,964,271 B2 | 6/2011 | Norsten et al. |
| 8,001,889 B2 | 8/2011 | Gaugenrieder et al. |
| 8,124,791 B2 | 2/2012 | Shinjo et al. |
| 8,158,693 B2 | 4/2012 | Breton et al. |
| 8,222,313 B2 | 7/2012 | Iftime et al. |
| 8,771,787 B2 | 7/2014 | Breton et al. |
| 8,895,400 B2 | 11/2014 | Seo et al. |
| 9,011,594 B1 | 4/2015 | Kanungo et al. |
| 9,193,209 B2 | 11/2015 | Dooley et al. |
| 9,283,795 B1 | 3/2016 | Kanungo et al. |
| 9,359,512 B2 | 6/2016 | Moorlag et al. |
| 9,387,661 B2 | 7/2016 | Zirilli |
| 2002/0040073 A1 | 4/2002 | Stone et al. |
| 2002/0107303 A1 | 8/2002 | Miyabashi et al. |
| 2003/0003323 A1 | 1/2003 | Murakami |
| 2003/0021961 A1 | 1/2003 | Ylitalo et al. |
| 2003/0044691 A1 | 3/2003 | Setthachayanon et al. |
| 2003/0073762 A1 | 4/2003 | Jung et al. |
| 2003/0149130 A1 | 8/2003 | Kondo |
| 2004/0063809 A1 | 4/2004 | Fu et al. |
| 2004/0132862 A1 | 7/2004 | Woudenberg |
| 2004/0233465 A1 | 11/2004 | Coyle |
| 2005/0166783 A1 | 8/2005 | Ylitalo et al. |
| 2006/0054040 A1 | 3/2006 | Daems et al. |
| 2007/0073762 A1 | 3/2007 | Adamson et al. |
| 2007/0166479 A1* | 7/2007 | Drake et al. .................. 427/535 |
| 2007/0259986 A1* | 11/2007 | Elwakil ................ C09D 11/101 522/83 |
| 2008/0090929 A1 | 4/2008 | Wilson et al. |
| 2008/0139743 A1 | 6/2008 | Krishnan et al. |
| 2008/0241485 A1 | 10/2008 | Shimohara et al. |
| 2008/0258345 A1 | 10/2008 | Bens et al. |
| 2008/0317957 A1 | 12/2008 | Overbeek et al. |
| 2009/0038506 A1* | 2/2009 | Odell et al. ................ 106/31.13 |
| 2009/0104373 A1 | 4/2009 | Vanbesien et al. |
| 2009/0110843 A1* | 4/2009 | Halahmi ............... C09D 11/101 427/511 |
| 2009/0135239 A1 | 5/2009 | Chretien et al. |
| 2009/0280302 A1 | 11/2009 | Fukumoto et al. |
| 2010/0020123 A1 | 1/2010 | Hirato |
| 2010/0067056 A1* | 3/2010 | Rich et al. ..................... 358/2.1 |
| 2010/0214373 A1 | 8/2010 | Carr et al. |
| 2010/0239777 A1 | 9/2010 | Nakajima et al. |
| 2011/0045199 A1 | 2/2011 | Cong |
| 2011/0141187 A1 | 6/2011 | Takabayashi |
| 2011/0188023 A1 | 8/2011 | Rondon et al. |
| 2011/0196058 A1 | 8/2011 | Breton et al. |
| 2011/0262711 A1 | 10/2011 | Chopra et al. |
| 2012/0040156 A1 | 2/2012 | Ohashi et al. |
| 2012/0103212 A1 | 5/2012 | Stowe et al. |
| 2012/0103213 A1 | 5/2012 | Stowe et al. |
| 2012/0103218 A1 | 5/2012 | Stowe et al. |
| 2012/0103221 A1* | 5/2012 | Stowe et al. .................. 101/483 |
| 2012/0157561 A1 | 6/2012 | Gould et al. |
| 2013/0050366 A1 | 2/2013 | Sasada et al. |
| 2013/0104756 A1 | 5/2013 | Stowe et al. |
| 2013/0305946 A1 | 11/2013 | Iftime et al. |
| 2013/0305947 A1 | 11/2013 | Iftime et al. |
| 2013/0307913 A1 | 11/2013 | Kawashima et al. |
| 2013/0310479 A1 | 11/2013 | Lee et al. |
| 2013/0310517 A1 | 11/2013 | Lee et al. |
| 2013/0324653 A1 | 12/2013 | Bollard et al. |
| 2014/0235752 A1 | 8/2014 | Gharapetian et al. |
| 2014/0333704 A1 | 11/2014 | Takabayashi et al. |
| 2014/0340455 A1 | 11/2014 | Breton et al. |
| 2015/0093690 A1 | 4/2015 | Shimura et al. |
| 2015/0170498 A1 | 6/2015 | Beggs et al. |
| 2015/0174887 A1 | 6/2015 | Moorlag et al. |
| 2015/0175820 A1 | 6/2015 | Breton et al. |
| 2015/0175821 A1 | 6/2015 | Moorlag et al. |
| 2016/0090490 A1 | 3/2016 | Moorlag et al. |
| 2016/0176185 A1 | 6/2016 | Kanungo et al. |
| 2016/0177113 A1 | 6/2016 | Allen et al. |
| 2016/0222231 A1 | 8/2016 | Allen et al. |
| 2016/0230027 A1 | 8/2016 | Birau et al. |
| 2016/0237290 A1 | 8/2016 | Moorlag et al. |
| 2016/0257829 A1 | 9/2016 | Breton et al. |
| 2016/0264798 A1 | 9/2016 | Allen et al. |
| 2016/0333205 A1 | 11/2016 | Lee et al. |

FOREIGN PATENT DOCUMENTS

| | | |
|---|---|---|
| JP | 2011208019 A | 10/2011 |
| WO | 2013119539 A1 | 8/2013 |

OTHER PUBLICATIONS

Breton et al., U.S. Appl. No. 13/474,138, titled "Inks for Offset Digital Printing Applications," filed May 17, 2012.
Iftime et al., U.S. Appl. No. 13/473,791, titled "Fluorescent Security Enabled Ink for Digital Offset Printing Applications," filed May 17, 2012.
Iftime et al., U.S. Appl. No. 13/473,921, titled "Photochromic Security Enabled Ink for Digital Offset Printing Applications," filed May 17, 2012.
Allen, et al., "Acrylate Ink Compositions for Ink-Based Digital Lithographic Printing", U.S. Appl No. 14/610,437, filed Jan. 30, 2015.
Birau, et al., "White Ink Composition for Ink-Based Digital Printing", U.S. Appl. No. 14/619,820, filed Feb. 11, 2015.
Moorlag, et al., "Hyperbranched Ink Compositions for Controlled Dimensional Change and Low Energy Curing", U.S. Appl. No. 14/620,945, filed Feb. 12, 2015.
Breton, et al., "Process Black Ink Compositions and Uses Thereof", U.S. Appl. No. 14/635,679, filed Mar. 2, 2015.
Leach, et al., "The Printing Ink Manual, 5th Edition", Blue Print, New York, pp. 84-86, 516, 525, 544-550, 724-726 (1993).
Henri Bouas-Laurent, et al., Organic Photochromism (IUPAC Technical Report), Pure Appl. Chem., vol. 73, No. 4, pp. 639-665, 2001.
Communication dated May 4, 2015, issued in EP Appl. No. 14196839.6, pp. 1-5.
Thesis of Enrique Michel-Sanchez, Impact of Particle Morphology on the Rheology of PCC-Based Coatings, Aug. 2005.

(56) References Cited

OTHER PUBLICATIONS

Allen, et al., "Acrylate Ink Compositions for Ink-Based Digital Lithographic Printing," U.S. Appl. No. 14/573,913, filed Dec. 17, 2014.
Allen, et al., "Acrylate Ink Compositions for Ink-Based Digital Lithographic Printing", U.S. Appl. No. 14/645,153, filed Mar. 11, 2015.
Allen, et al., "Acrylate Ink Compositions for Ink-Based Digital Lithographic Printing", U.S. Appl. No. 15/435,098, filed Feb. 16, 2017.
Breton, et al. "Aqueous Dispersible Polymer Inks", U.S. Appl. No. 15/442,260, filed Feb. 24, 2017.
Badesha, et al. "Fluorosilicone composite And Formulation Process For Imaging Plate", U.S. Appl. No. 15/222,364, filed Jul. 28, 2016.
Stowe, et al., "Methods for Rejuvenating an Imaging Member of an Ink-Based Digital Printing System", U.S. Appl No. 15/240,691, filed Aug. 18, 2016.
Birau, et al. "Ink Composition and Method of Printing", U.S. Appl. No. 15/377,881, filed Dec. 13, 2016.

\* cited by examiner

WHITE INK COMPOSITION FOR INK-BASED DIGITAL PRINTING

FIELD OF DISCLOSURE

The disclosure relates to ink-based digital printing. In particular, this disclosure relates to white inks suitable for ink-based digital printing, among other printing applications.

BACKGROUND

Conventional lithographic printing techniques cannot accommodate true high-speed variable data printing processes in which images to be printed change from impression to impression, for example, as enabled by digital printing systems. The lithography process is often relied upon, however, because it provides very high quality printing due to the quality and color gamut of the inks used. Lithographic inks are also less expensive than other inks, toners, and many other types of printing or marking materials.

Ink-based digital printing uses a variable data lithography printing system, or digital offset printing system. A "variable data lithography system" is a system that is configured for lithographic printing using lithographic inks and based on digital image data, which may be variable from one image to the next. "Variable data lithography printing," or "digital ink-based printing," or "digital offset printing" is lithographic printing of variable image data for producing images on a substrate that are changeable with each subsequent rendering of an image on the substrate in an image forming process.

For example, a digital offset printing process may include transferring radiation-curable ink onto a portion of a fluorosilicone-containing imaging member or printing plate that has been selectively coated with a dampening fluid layer according to variable image data. The ink is then transferred from the printing plate to a substrate such as paper, plastic, or metal on which an image is being printed and cured. The same portion of the imaging plate may be optionally cleaned depending on ink type and used to make a succeeding image that is different than the preceding image, based on the variable image data.

Digital offset printing inks differ from conventional inks because they must meet demanding rheological requirements imposed by the lithographic printing process while being compatible with system component materials and meeting the functional requirements of sub-system components, including wetting and transfer.

SUMMARY

Digital offset inks are provided that are radiation-curable, compatible with ink-based digital printing system components, and have high transfer efficiency, which reduces ghosting of previously printed images if a cleaning system is not used. Digital offset inks contain much higher (up to 10 times, for example, or 10% to 50% by weight of the total weight of the ink composition) pigment loading, and therefore have higher viscosity at room temperature and the temperature of application during a printing process. Methods for manufacturing digital offset inks having high pigment loading and, optionally, high viscosities have been provided. For example, U.S. patent application Ser. No. 13/474,185, titled "Methods For Manufacturing Curable Inks For Digital Offset Printing Applications And The Inks Made Therefrom," filed on May 17, 2012, by Lee et al., the disclosure of which is hereby incorporated by reference herein in its entirety, discloses UV curable ink compositions and methods for the manufacture thereof that do not gel, contain a high pigment load, and can have a high viscosity that is advantageous for digital offset printing.

Related art inks including traditional offset inks can present the following challenges: solubility in the dampening fluid, swelling of the silicone layer on the imaging member, poor release properties from the imaging member, and limited curing performance. Digital offset inks must be compatible with a surface layer of the imaging member. For example, the ink composition should not swell and deform the silicone, fluorosilicone, and/or VITON-containing imaging member surface layer, thereby causing image quality defects. The digital offset ink should also be formulated for adhering to portions of the imaging member surface. For example, such surface layer portions include those from which dampening fluid has been removed during a lithographic printing process, after laser patterning of a dampening fluid layer applied to the imaging member surface layer.

Further, digital offset ink must be compatible with dampening fluids such as octamethylcyclotetrasiloxane (cyclotetrasiloxane, "D4") and decamethylcyclopentasiloxane (cyclopentasiloxane, "D5"), and not mixing with the dampening fluid thereby affecting background areas, or portions of the imaging member surface from which dampening fluid has not been removed after laser patterning.

Digital offset ink compositions have been provided that have certain wetting and release properties that are useful with the re-imageable imaging member of digital offset systems, and that are also compatible with non-aqueous dampening fluids. For example, U.S. patent application Ser. No. 13/474,138, titled "Inks For Offset Digital Printing Applications," filed on May 17, 2012, by Breton et al., the disclosure of which is incorporated herein by reference in its entirety, discloses ink compositions having desired solubility parameters that are compatible with dampening fluids.

Other ink compositions suitable for ink-based digital printing have been developed. For example, U.S. patent application Ser. No. 13/473,791, titled "Fluorescent Security Enabled Ink For Digital Offset Printing Applications," filed on May 17, 2012, by Iftime et al., the disclosure of which is incorporated herein by reference in its entirety, discloses an ink composition useful for digital offset printing applications comprises a fluorescent colorant and a plurality of curable compounds. The compounds have desirable Hansen solubility parameters are as described herein, and the ink composition is both compatible with certain dampening fluids and has certain rheological properties, including a low viscosity. The fluorescent ink composition is useful for printing security features at high speed in short runs with customized data to produce anti-counterfeit packaging.

Also, U.S. patent application Ser. No. 13/473,921, titled "Photochromic Security Enabled Ink for Digital Offset Printing Applications," filed on May 17, 2012, by Iftime et al., the disclosure of which is incorporated herein by reference in its entirety, discloses certain photochromic ink compositions which are compatible with dampening fluids and are useful for providing security information in variable data lithographic printing applications.

New radiation curable ink designs for digital offset inks are desired, however, for enhanced ink-based digital printing. It has been found that available inks for ink-based digital printing suffer from shortfalls relating to solubility with dampening fluid, image background issues, high cost requirements, a narrow design space. Improved inks are provided that meet wetting and release requirements while being compatible with non-aqueous dampening fluid, and tending not to swell a silicone-containing imaging member surface are provided. Moreover, inks are provided that enable highly efficient ink transfer from an ink delivery system such as an anilox roll during a printing process while avoiding image quality defects in a resulting printed image.

White radiation curable ink compositions are provided for expanding ink-based digital printing capabilities for printing processes. For example, white inks in accordance with embodiments enable enhanced label processing. White ink compositions in accordance with embodiments meet subsystem requirements that are unique to variable data lithography and architecture such as those discussed above. Ink compositions of embodiments satisfy crucial wetting and release property requirements, and may be compatible with non-aqueous dampening fluids. Moreover, ink compositions of embodiments are suitable for anilox roll ink delivery to a digital offset imaging member. In some systems and embodiments, ink compositions of embodiments may be partially cured prior to transfer.

Exemplary embodiments are described herein. It is envisioned, however, that any system that incorporates features of systems described herein are encompassed by the scope and spirit of the exemplary embodiments.

DETAILED DESCRIPTION

Figure 1:
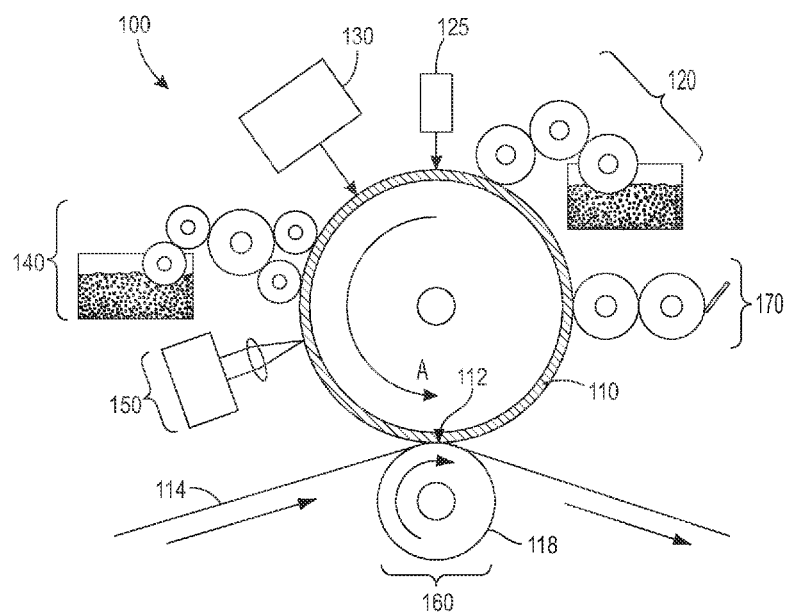
FIG. 1 shows a side diagrammatical view of a related art ink-based digital printing system.

Exemplary embodiments are intended to cover all alternatives, modifications, and equivalents as may be included within the spirit and scope of the apparatus and systems as described herein.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value.

Reference is made to the drawings to accommodate understanding of systems for ink-based digital printing using inks in accordance with embodiments. In the drawings, like reference numerals are used throughout to designate similar or identical elements. The drawings depict exemplary systems for ink-based digital printing, and data associated with an exemplary white ink composition in accordance with an embodiment.

White ink compositions in accordance with embodiments are not limited to use ink-based digital printing systems. Digital offset inks disclosed herein may be useful in conventional offset printing or hybrid conventional offset and digital offset printing systems. Nonetheless, white digital offset inks of embodiments meet systems requirements that are unique to digital offset printing systems. In particular, inks of embodiments satisfy wetting and release requirements imposed by the re-imageable imaging member of ink-based digital printing systems. Further, inks of embodiments are compatibility with dampening fluids suitable for ink-based digital printing, including non-aqueous dampening fluids. Inks of embodiments are enabled for transfer from an ink delivery system such as anilox roll to the imaging member, e.g., reimageable offset plate.

Exemplary variable data lithography systems are disclosed in U.S. patent application Ser. No. 13/095,714 ("714 application"), titled "Variable Data Lithography System," filed on Apr. 27, 2011, by Stowe et al., the disclosure of which is hereby incorporated by reference herein in its entirety. The systems and methods disclosed in the 714 application are directed to improvements on various aspects of previously-attempted variable data imaging lithographic marking concepts based on variable patterning of dampening fluids to achieve effective truly variable digital data lithographic printing.

A general description of an exemplary ink-based digital printing system 100 as shown in FIG. 1 is provided here. Additional details regarding individual components and/or subsystems shown in the exemplary system 100 of FIG. 1 may be found in the 714 application.

As shown in FIG. 1, the exemplary system 100 may include an imaging member 110. The imaging member 110 in the embodiment shown in FIG. 1 is a drum, but this exemplary depiction should not be interpreted so as to exclude embodiments wherein the imaging member 110 includes a drum, plate or a belt, or another now known or later developed configuration. The reimageable surface may be formed of materials including, for example, a class of materials commonly referred to as silicones, including polydimethylsiloxane (PDMS), among others. The reimageable surface may be formed of a relatively thin layer over a mounting layer, a thickness of the relatively thin layer being selected to balance printing or marking performance, durability and manufacturability.

The imaging member 110 is used to apply an ink image to an image receiving media substrate 114 at a transfer nip 112. The transfer nip 112 is formed by an impression roller 118, as part of an image transfer mechanism 160, exerting pressure in the direction of the imaging member 110. Image receiving medium substrate 114 should not be considered to be limited to any particular composition such as, for example, paper, plastic, or composite sheet film. The exemplary system 100 may be used for producing images on a wide variety of image receiving media substrates. The 714 application also explains the wide latitude of marking (printing) materials that may be used, including marking materials with pigment densities greater than 10% by weight. As does the 714 application, this disclosure will use the term ink to refer to a broad range of printing or marking materials to include those which are commonly understood to be inks, pigments, and other materials which may be applied by the exemplary system 100 to produce an output image on the image receiving media substrate 114.

The 714 application depicts and describes details of the imaging member 110 including the imaging member 110 being comprised of a reimageable surface layer formed over a structural mounting layer that may be, for example, a cylindrical core, or one or more structural layers over a cylindrical core.

The exemplary system 100 includes a dampening fluid system 120 generally comprising a series of rollers, which may be considered as dampening rollers or a dampening unit, for uniformly wetting the reimageable surface of the imaging member 110 with dampening fluid. A purpose of the dampening fluid system 120 is to deliver a layer of dampening fluid, generally having a uniform and controlled thickness, to the reimageable surface of the imaging member 110. As indicated above, it is known that a dampening fluid such as fountain solution may comprise mainly water optionally with small amounts of isopropyl alcohol or ethanol added to reduce surface tension as well as to lower evaporation energy necessary to support subsequent laser patterning, as will be described in greater detail below. Small amounts of certain surfactants may be added to the fountain solution as well. Alternatively, other suitable dampening fluids may be used to enhance the performance of ink based digital lithography systems. Exemplary dampening fluids include water, Novec 7600 (1,1,1,2,3,3-Hexafluoro-4-(1,1,2,3,3,3-hexafluoropropoxyl)pentane and has CAS#870778-34-0.), and D4 (octamethylcyclotetrasiloxane). Other suitable dampening fluids are disclosed, by way of example, in co-pending U.S. patent application Ser. No. 13/284,114, filed on Oct. 28, 2011, titled "Dampening Fluid For Digital Lithographic Printing," the disclosure of which is hereby incorporated herein by reference in its entirety.

Once the dampening fluid is metered onto the reimageable surface of the imaging member 110, a thickness of the dampening fluid may be measured using a sensor 125 that may provide feedback to control the metering of the dampening fluid onto the reimageable surface of the imaging member 110 by the dampening fluid system 120.

After a precise and uniform amount of dampening fluid is provided by the dampening fluid system 120 on the reimageable surface of the imaging member 110, and optical patterning subsystem 130 may be used to selectively form a latent image in the uniform dampening fluid layer by imagewise patterning the dampening fluid layer using, for example, laser energy. Typically, the dampening fluid will not absorb the optical energy (IR or visible) efficiently. The reimageable surface of the imaging member 110 should ideally absorb most of the laser energy (visible or invisible such as IR) emitted from the optical patterning subsystem 130 close to the surface to minimize energy wasted in heating the dampening fluid and to minimize lateral spreading of heat in order to maintain a high spatial resolution capability. Alternatively, an appropriate radiation sensitive component may be added to the dampening fluid to aid in the absorption of the incident radiant laser energy. While the optical patterning subsystem 130 is described above as being a laser emitter, it should be understood that a variety of different systems may be used to deliver the optical energy to pattern the dampening fluid.

The mechanics at work in the patterning process undertaken by the optical patterning subsystem 130 of the exemplary system 100 are described in detail with reference to FIG. 5 in the 714 application. Briefly, the application of optical patterning energy from the optical patterning subsystem 130 results in selective removal of portions of the layer of dampening fluid.

Following patterning of the dampening fluid layer by the optical patterning subsystem 130, the patterned layer over the reimageable surface of the imaging member 110 is presented to an inker subsystem 140. The inker subsystem 140 is used to apply a uniform layer of ink over the layer of dampening fluid and the reimageable surface layer of the imaging member 110. The inker subsystem 140 may use an anilox roller to meter an offset lithographic ink onto one or more ink forming rollers that are in contact with the reimageable surface layer of the imaging member 110. Separately, the inker subsystem 140 may include other traditional elements such as a series of metering rollers to provide a precise feed rate of ink to the reimageable surface. The inker subsystem 140 may deposit the ink to the pockets representing the imaged portions of the reimageable surface, while ink on the unformatted portions of the dampening fluid will not adhere to those portions.

The cohesiveness and viscosity of the ink residing in the reimageable layer of the imaging member 110 may be modified by a number of mechanisms. One such mechanism may involve the use of a rheology (complex viscoelastic modulus) control subsystem 150. The rheology control system 150 may form a partial crosslinking layer of the ink on the reimageable surface to, for example, increase ink cohesive strength relative to the reimageable surface layer. Curing mechanisms may include optical or photo curing, heat curing, drying, or various forms of chemical curing. Cooling may be used to modify rheology as well via multiple physical cooling mechanisms, as well as via chemical cooling.

The ink is then transferred from the reimageable surface of the imaging member 110 to a substrate of image receiving medium 114 using a transfer subsystem 160. The transfer occurs as the substrate 114 is passed through a nip 112 between the imaging member 110 and an impression roller 118 such that the ink within the voids of the reimageable surface of the imaging member 110 is brought into physical contact with the substrate 114. With the adhesion of the ink having been modified by the rheology control system 150, modified adhesion of the ink causes the ink to adhere to the substrate 114 and to separate from the reimageable surface of the imaging member 110. Careful control of the temperature and pressure conditions at the transfer nip 112 may allow transfer efficiencies for the ink from the reimageable surface of the imaging member 110 to the substrate 114 to exceed 95%. While it is possible that some dampening fluid may also wet substrate 114, the volume of such a dampening fluid will be minimal, and will rapidly evaporate or be absorbed by the substrate 114.

In certain offset lithographic systems, it should be recognized that an offset roller, not shown in FIG. 1, may first receive the ink image pattern and then transfer the ink image pattern to a substrate according to a known indirect transfer method.

Following the transfer of the majority of the ink to the substrate 114, any residual ink and/or residual dampening fluid must be removed from the reimageable surface of the imaging member 110, preferably without scraping or wearing that surface. An air knife may be employed to remove residual dampening fluid. It is anticipated, however, that some amount of ink residue may remain. Removal of such remaining ink residue may be accomplished through use of some form of cleaning subsystem 170. The 714 application describes details of such a cleaning subsystem 170 including at least a first cleaning member such as a sticky or tacky member in physical contact with the reimageable surface of the imaging member 110, the sticky or tacky member removing residual ink and any remaining small amounts of surfactant compounds from the dampening fluid of the reimageable surface of the imaging member 110. The sticky or tacky member may then be brought into contact with a smooth roller to which residual ink may be transferred from the sticky or tacky member, the ink being subsequently stripped from the smooth roller by, for example, a doctor blade.

The 714 application details other mechanisms by which cleaning of the reimageable surface of the imaging member 110 may be facilitated. Regardless of the cleaning mechanism, however, cleaning of the residual ink and dampening fluid from the reimageable surface of the imaging member 110 is essential to preventing ghosting in the proposed system. Once cleaned, the reimageable surface of the imaging member 110 is again presented to the dampening fluid system 120 by which a fresh layer of dampening fluid is supplied to the reimageable surface of the imaging member 110, and the process is repeated.

Before transfer of an ink image to an image receiving substrate or print medium, the ink image may be partially cured at a partial UV cure subsystem. White ink compositions of embodiments are suitable for ink-based digital printing using partial cure.

As discussed above, digital offset ink must possess physical and chemical properties that are specific to ink-based digital printing systems. The ink must be compatible with materials that it comes in contact with, including the imaging plate and dampening fluid, and printable substrates such as paper, metal, or plastic. The ink must also meet all functional requirements of the subsystems including wetting and transfer properties defined by subsystem architecture and material sets.

Inks formulated for ink-based digital printing, or digital offset inks, are different in many ways from other inks developed for printing applications, including pigmented solvents, UV gel inks, and other inks. For example, digital offset inks contain much higher pigment and therefore have higher viscosity at room temperature than other inks, which can make ink delivery by way of an anilox roll or inkjet system difficult. Digital offset inks must meet certain wetting and release property requirements imposed by the imaging member used for ink-based digital printing processes, while being compatible with non-aqueous dampening fluid options.

The inks described herein may include the following components: (a) radiation-curable functional acrylate monomer compounds, including mono-, di-, and tri-functional acrylate monomers, oligomers; (b) dispersants; (c) pigments; (d) clays; (e) initiators; (f) additional curable compounds including monomers, oligomers, including oligomers from SARTOMER USA, LLC or CYTEC Industries, Inc., prepolymers, polymers; (g) additives including surfactants, free-radical scavengers, and the like.

The radiation curable monomer (a) may be added in any suitable amount. For example, the monomer or oligomer can be present in any suitable amount. In embodiments, the monomer or oligomer, or combination thereof is added in an amount of from about 10 to about 85%, or from about 30 to about 80%, or from about 50 to about 70%, by weight based on the total weight of the curable ink composition.

The dispersant components (b) may include any suitable or desired dispersant including, but not limited to AB-diblock copolymers of high molecular weight such as EFKA® 4340 available from BASF SE, and DISPERBYK® 2100 available from Byk-Chemie GmbH, or a mixture thereof. In a specific embodiment, the dispersant mixture comprises a cyclohexane dimethanol diacrylate (such as CD406® available from Sartomer USA, LLC) and at least one additional component, such as EFKA® 4340 is a high molecular weight dispersing agent having an AB-diblock copolymer structure available from BASF SE. In an exemplary embodiment, the dispersant is a polymeric dispersant, such as SOLSPERSE® 39000, commercially available from The Lubrizol Corporation. The dispersant may be added in an amount within the range of from about 10% to about 80% by weight, based on the weight of pigment in the composition.

The disclosed curable ink composition also includes a colorant or pigment component (c), which may be any desired or effective colorant may be employed, including pigments, mixtures of pigments, mixtures of pigments and dyes, and the like, provided that the colorant may be dissolved or dispersed in the at least one monomer and at least one dispersant. In specific embodiments, the colorant is a pigment. Examples of suitable pigments include titanium dioxide, $TiO_2$. $TiO_2$ is commercially available from DuPont, TI-PURE series of pigments, while both anatase and rutile titanium dioxide can be used, the rutile crystal structure is preferred, optimum particle size is preferred to be in the 200 to 300 nanometers. The disclosed curable ink composition may also contain in addition to titanium dioxide, one of more of the following additives: clay, silica, magnesium silicate or zinc oxide.

For example, a white ink composition in accordance with an exemplary embodiment may include the following components: a white pigment, DuPont Ti-PURE $Tio_2$, having an oil absorption of 15.0 and pH=8.2, and LAB values of 99.66, −0.58, and 2.05, respectively; curable functional acrylate monomers available from SARTOMER, including CN 293, CN294E, CN259, CN454; SOLSPERSE® 39000 dispersant from Lubrizol; a thermal stabilizer, IRGASTAB UV10 available from BASF; aerosol 200 vs available from Degussa Canada Ltd; and a photoinitiator system composed of IRGACURE 819, Bis(2,4,6-trimethylbenzoyl)-phenyl-phosphineoxide), and IRGACURE 184, 1-Hydroxy-cyclohexyl-phenyl-ketone. The photoinitiator system may include IRGACURE 379, 2-Dimethylamino-2-(4-methyl-benzyl)-1-(4-morpholin-4-yl-phenyl)-butan-1-one, and ESACURE Kip 150, Oligo[2-hydroxy-2-methyl-1-[4-(1-methylvinyl) phenyl]propanone] available from BASF, BASF, and Lamberti, respectively. Other components or additives may include: polyester oligomers selected from Sartomer, CN2255, a high viscosity polyester acrylate oligomer with a glass transition T of −13 degrees Celsius, and CN2256, also a polyester acrylate oligomer with viscosity of 11,000 cps at 60 degrees Celsius, and a glass transition T of −22 degrees Celsius; an hindered amine light stabilizer such as TINUVIN 292; a levelling agent such as BYK 3500, a polyether modified acryl functional polydimethylsiloxane; and a defoamer, ADDITOL VXL 4951 available from Cytek.

Two radiation curable white digital offset inks in accordance with embodiments were produced and tested. The inks were prepared by the process disclosed by Lee et al. in the 185 application. Exemplary formulations are disclosed in Table 1.

TABLE 1

White Digital Offset Ink

| Chemical | White_1 (W1) wt % | White_2 (W2) wt % |
|---|---|---|
| TiO2 | 35.00 | 35.00 |
| Sartomer CN293 | 4.00 | 0.00 |
| Sartomer CN294E | 0.00 | 43.35 |
| Sartomer SR259 | 32.00 | 9.50 |
| Sartomer SR454 | 16.00 | 0.00 |
| Lubrizol Solsperse 39000 | 5.25 | 5.25 |
| Southern Clay HY | 1.70 | 1.70 |
| Ciba IRGACURE 184 | 2.92 | 3.00 |
| Ciba IRGACURE 819 | 2.10 | 2.00 |
| Ciba IRGASTAB UV10 | 0.20 | 0.20 |
| BYK3500 | 0.83 | 0.00 |
| Total | 100.00 | 100.00 |
| Zero Shear Viscosity, cps | $1.33 \times 10^6$ | $4.25 \times 10^5$ |
| Viscosity, 5 sec−1 | $2.2 \times 10^3$ | $4.32 \times 10^4$ |
| Viscosity, 50 sec−1 | $7.2 \times 10^2$ | $3.6 \times 10^4$ |
| Shear Thinning Index | 0.33 | 0.83 |

Exemplary formulations are shown in Table 1, and do not limit the scope of disclosure. Ink formulations made in accordance with the two inks shown in Table 1 were characterized to determine rheology. The shear viscosities of samples were measured using an Ares G2 controlled-strain rheometer having 25 mm parallel plate geometry, set at 0.5 mm gap and 25° C. such that the applied shear rate sweep ranged from 0.0001 to 500 s$^{-1}$. An ARES G2 controlled strain rheometer with a PELTIER temperature control (25MN, 0.02 RAD cone plate) for rapid heating and cooling was used for obtaining the rheology data. A flow sweep test procedure was run at 25° C., at a shear rate of 1.0E+−04 to 500 1/sec.

The printing performance of the radiation curable white digital offset ink was tested using hand testing. For example, the W2 ink formulation shown in Table 1 was applied by a hand roller or brushed to fluorosilicone-over-silicone testplates and observed to wet the plate. D4 dampening fluid was applied to the plate before inking. The white ink did not adhere to the dampening fluid covered portion of the fluorosilicone. A corresponding ink image was transferred to black paper to form a transferred ink image demonstrating good background performance. The immediate transfer to paper resulted in splitting of ink at an observed 50% transfer efficiency. The application of D4 dampening fluid to the imaging plate, followed by rolling ink over the plate with a rubber roller and transferred to paper, demonstrated good background performance wherein white ink is not present in the background area that corresponds to the dampening fluid-coated portion of the fluorosilicone containing imaging plate.

Performing light partial curing, for example, using fluorescent room lighting fixture for 24 hours, resulted in efficient transfer of white ink to paper in further tests, above about 90% transfer efficiency, and full transfer of the ink in some embodiments. Slower curing at low intensity, or surrogate curing, may be easily scaled to higher intensity and short exposure time. The partially cured ink was still wet and smeared to the touch. A controlled experiment of ink left for 72 hours in the dark resulted in a 50% transfer efficiency, indicating that UV-induced curing enhances ink transfer. Transfer efficiency may be further optimized through appropriate selection of curable components and leveling agent, and by controlling ink delivery process to obtain images of appropriate thickness.

Figure 2:
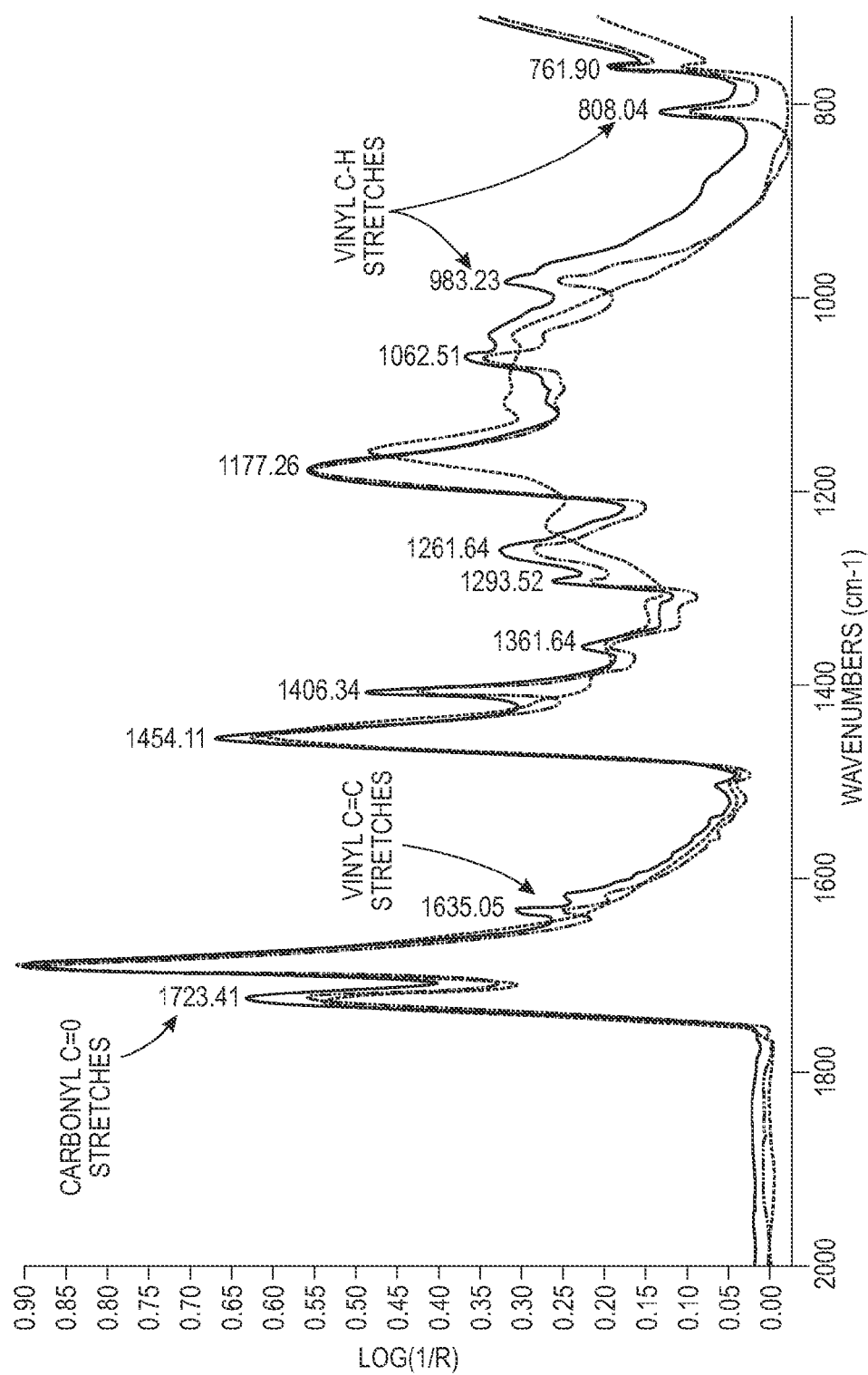
FIG. 2 shows IR spectra for white digital offset ink in accordance with embodiments.

FIG. 2 shows an infrared spectra of white inks that are (a) uncured, (b) partially cured sufficient for transfer, and (c) fully cured. The uncured, partially cured, and fully cured white digital offset inks were measured by FTIR to determine extent of cure. The top and bottom of the partially cured layers were measured, and were found to display the same spectrum. The uncured inks display IR absorptions for the carbonyl and vinyl peaks at 1700 and 1600 cm-1, respectively. The fully cured ink displays 100% reduction of vinyl peaks. The partially cured inks exhibit less than 10% reduction of the peaks, indicating 10% curing of the ink, or less, to be sufficient for transfer. Color and gloss measurements of the white inks are as follows: L*=96.94; A*=−0.05; B*=4.22; and 60% gloss=24.

It will be appreciated that the above-disclosed and other features and functions, or alternatives thereof, may be desirably combined into many other different systems or applications. Also, various presently unforeseen or unanticipated alternatives, modifications, variations or improvements therein may be subsequently made by those skilled in the art.

What is claimed is:

1. An ink composition for variable data lithographic printing, comprising:
    a white colorant component in proportion of at least 20% by weight suspended in solution in the ink composition; and
    two or more of at least one curable monomer, at least one dispersant; and
    a photo initiator system, wherein the ink composition has a zero shear viscosity at 25° C. ranging from about 4.25 ×105 cps to about 1.33 ×106 cps, and wherein the ink composition is not a UV gel ink for printing applications.

2. The ink composition of claim 1, wherein the white colorant component comprises a pigment.

3. The ink composition of claim 2, wherein the pigment comprises titanium dioxide.

4. The ink composition of claim 2, wherein the pigment is present in an amount of 35 weight percent.

5. The ink composition of claim 2, wherein the pigment is present in an amount lying in a range of 20 to 80 weight percent.

6. The ink composition of claim 2, the pigment further comprising:
    a plurality of pigment particles, wherein an average diameter of 70% or more of the plurality of pigment particles lies in a range of about 150 nanometers to about 400 nanometers.

7. The ink composition of claim 1, comprising the ink composition being configured for ink-based digital printing using an imaging member from which the ink is transferred to a printable substrate at an efficiency of 90% or greater.

8. The ink composition of claim 1, comprising a plurality of the at least one curable monomer, the at least one curable monomer having a low molecular weight, wherein less than 40% of the at least one low molecular weight curable monomers of the plurality of monomers are converted to high molecular weight monomers upon UV exposure.

9. The ink composition of claim 1, comprising a plurality of the at least one curable monomer, the at least one curable monomer having a low molecular weight, wherein less than 20% of the at least one low molecular weight curable monomers of the plurality of monomers are converted to high molecular weight monomers upon UV exposure.

10. A method of ink-based digital printing, comprising:
    applying a white ink composition onto a re-imageable imaging member surface, the reimageable imaging member having dampening fluid disposed thereon, wherein the white ink composition comprises a white colorant component in proportion of at least 20% by weight suspended in solution in the ink composition and two or more of at least one curable monomer, at least one dispersant, and a photo initiator system;
    wherein the white ink composition has a zero shear viscosity at 25° C. ranging from about 4.25 ×105 to about 1.33 ×106 cps, and wherein the white ink composition is not a UV gel ink for printing applications.

11. The method of claim 10, comprising:
    applying the dampening fluid to the imaging member surface before the applying the white ink composition.

12. The method of claim 11, the white ink composition comprising titanium dioxide.

13. The method of claim 12, the titanium dioxide being present in an amount lying in a range of 20 weight percent to 80 weight percent.

14. The method of claim 12, the dampening fluid comprising octamethylcyclotetrasiloxane, decamethylcyclopentasiloxane, or a mixture thereof.

15. The method of claim 11, the applying the white ink further comprising forming an ink image.

16. The method of claim 15, comprising:
transferring the ink image from the re-imageable surface of the imaging member to a printable substrate.

17. The method of claim 16, wherein the printable substrate is a label.

18. The method of claim 15, comprising:
partially curing the ink image before the transferring, wherein the partially curing comprises vinyl peak conversion of about 5 percent to about 40 percent.

19. The method of claim 18, comprising:
curing the ink image after the transferring.

20. The method of claim 10, the applying the ink further comprising applying the ink using an anilox delivery system.

* * * * *